United States Patent

Yoshikawa et al.

(10) Patent No.: US 10,563,602 B2
(45) Date of Patent: Feb. 18, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi (JP)

(72) Inventors: Yuya Yoshikawa, Anjo (JP); Isao Nakajima, Toyota (JP); Akihiro Katayama, Toyota (JP); Ryo Suzuki, Toyota (JP); Sohichi Imai, Toyota (JP); Eiichiro Kido, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/152,036

(22) Filed: Oct. 4, 2018

(65) Prior Publication Data

US 2019/0170108 A1    Jun. 6, 2019

(30) Foreign Application Priority Data

Dec. 6, 2017 (JP) ................................. 2017-234531

(51) Int. Cl.
 *F02P 5/15* (2006.01)
 *F02D 41/14* (2006.01)
 *F02D 41/00* (2006.01)

(52) U.S. Cl.
 CPC ..... *F02D 41/0085* (2013.01); *F02D 41/1498* (2013.01); *F02P 5/151* (2013.01); *F02P 5/1504* (2013.01)

(58) Field of Classification Search
 CPC .............. F02D 41/0085; F02D 41/1498; F02P 5/1504; F02P 5/1506; F02P 5/151

USPC .......... 123/406.23, 406.24, 406.47, 436, 673
See application file for complete search history.

(56) References Cited

U.S. PATENT DOCUMENTS

| | | | | |
|---|---|---|---|---|
| 4,527,523 A | * | 7/1985 | Daumer | F02P 5/1455 123/406.24 |
| 4,697,561 A | * | 10/1987 | Citron | F02D 41/0085 123/339.14 |
| 6,152,105 A | * | 11/2000 | Nishimura | F02D 37/02 123/339.11 |

(Continued)

FOREIGN PATENT DOCUMENTS

| | | |
|---|---|---|
| JP | 2002-213333 | 7/2002 |
| JP | 2012-197798 | 10/2012 |
| WO | WO 2015/122003 A1 | 8/2015 |

*Primary Examiner* — Erick R Solis
(74) *Attorney, Agent, or Firm* — Oblon, McClelland, Maier & Neustadt, L.L.P.

(57) ABSTRACT

A controller learns the degree of variation in the injection amount of fuel injection valves provided for respective cylinders when the fuel injection valves are operated to control the air-fuel ratios of the respective cylinders to be equal to each other. A first advancement requesting process causes the request for the ignition timing to be more advanced when the degree of variation is great than when the degree of variation is small. A second advancement requesting process causes the request for the ignition timing to be more advanced when the torque fluctuation amount of the internal combustion engine is than when the torque fluctuation amount is small. The ignition control process controls the ignition timing in accordance with the request of the more advanced one of the first advancement requesting process and the second advancement requesting process.

7 Claims, 5 Drawing Sheets

(56) References Cited

U.S. PATENT DOCUMENTS

| | | | | |
|---|---|---|---|---|
| 6,868,827 B2* | 3/2005 | Surnilla | ................ | F01N 3/2006 |
| | | | | 123/339.11 |
| 8,666,635 B2* | 3/2014 | Okazaki | ................ | F02D 37/02 |
| | | | | 123/406.23 |
| 2004/0193360 A1* | 9/2004 | Ishikawa | ............. | F02D 41/1497 |
| | | | | 701/111 |
| 2012/0310505 A1* | 12/2012 | Morgan | ................ | F02D 35/024 |
| | | | | 701/102 |

* cited by examiner

CONTROLLER AND CONTROL METHOD FOR INTERNAL COMBUSTION ENGINE

BACKGROUND

The present disclosure relates to a controller and a control method for an internal combustion engine. The controller and the control method control an internal combustion engine including ignition devices, fuel injection valves, and an exhaust purifying device. The exhaust purifying device purifies exhaust gas discharged from cylinders.

For example, International Publication No. 2015/122003 discloses a controller that retards ignition timing in order to warm up a catalyst (exhaust purifying device) provided in an exhaust passage of an internal combustion engine.

SUMMARY

An anomaly in the control of the internal combustion engine includes, for example, an imbalance anomaly, which is an anomaly of causing variation, or imbalance, in the injection amount of fuel injection valves of respective cylinders when the fuel injection valves are operated to control the air-fuel ratios in the respective cylinders to be equal to each other. If an imbalance anomaly occurs, oxygen and unburnt fuel flow into the exhaust purifying device, and the unburnt fuel is burned in the exhaust purifying device, which may cause the temperature of the exhaust purifying device to increase.

Furthermore, in a case in which a misfire occurs as an anomaly in the control of the internal combustion engine also, oxygen and unburnt fuel flow into the exhaust purifying device, and the unburnt fuel is burned in the exhaust purifying device, which may cause the temperature of the exhaust purifying device to increase. In a case in which such an imbalance anomaly or a misfire occurs, retarding the ignition timing excessively may possibly cause the temperature of the exhaust purifying device to be excessively increased, resulting in deterioration of the exhaust purifying device.

Examples of the present disclosure will now be described.

Example 1

A controller for an internal combustion engine is provided. The internal combustion engine includes ignition devices, fuel injection valves, and an exhaust purifying device, which purifies exhaust gas discharged from a plurality of cylinders, the controller being configured to execute an imbalance learning process of learning a degree of variation in an injection amount of the fuel injection valves provided for the respective cylinders when the fuel injection valves are operated to control air-fuel ratios of the respective cylinders to be equal to each other, a first advancement requesting process of causing a request for ignition timing to be more advanced when the degree of variation is great than when the degree of variation is small, a second advancement requesting process of causing the request for the ignition timing to be more advanced when a torque fluctuation amount of the internal combustion engine is great than when the torque fluctuation amount is small, and an ignition control process of controlling the ignition timing in accordance with the request of the more advanced one of the first advancement requesting process and the second advancement requesting process.

The temperature of the exhaust purifying device is increased more easily when the degree of variation is great than when the degree of variation is small since oxygen and unburnt fuel flow into the exhaust purifying device, and the unburnt fuel is burned in the exhaust purifying device. With this being the case, if the degree of variation is great, the first advancement requesting process advances the request for the ignition timing more than that in a case in which the degree of variation is small. Thus, even if there is a tendency that the temperature of the exhaust purifying device is easily increased due to the variation at the same time as when the exhaust temperature is increased due to retardation of the ignition timing, the temperature of the exhaust purifying device is inhibited from being excessively increased. Furthermore, the amount of unburnt fuel and the amount of oxygen in the exhaust gas are more likely to increase when the torque fluctuation amount is great than when the torque fluctuation amount is small. Thus, as the oxygen and the unburnt fuel flow into the exhaust purifying device, and the unburnt fuel is burned in the exhaust purifying device, the temperature of the exhaust purifying device is easily increased. With this being the case, if the torque fluctuation amount is great, the second advancement requesting process advances the request for the ignition timing more than that in a case in which the torque fluctuation amount is small. Thus, even if there is a tendency that the temperature of the exhaust purifying device is easily increased due to the combustion state with a great torque fluctuation amount at the same time as when the exhaust temperature is increased due to retardation of the ignition timing, the temperature of the exhaust purifying device is inhibited from being excessively increased.

In particular, in the above-described configuration, the imbalance anomaly and the torque fluctuation are appropriately addressed by controlling the ignition timing in accordance with the more advanced one of the requests generated by the first advancement requesting process and the second advancement requesting process.

Example 2

The controller of Example 1 is configured to further execute a requested retardation amount setting process of setting a requested retardation amount of the ignition timing in accordance with a rotation speed of a crankshaft and a load of the internal combustion engine.

The first advancement requesting process calculates a first correction coefficient, which is a correction coefficient used to multiply the requested retardation amount in order to correct the requested retardation amount such that the requested retardation amount is decreased.

The second advancement requesting process calculates a second correction coefficient, which is a correction coefficient used to multiply the requested retardation amount in order to correct the requested retardation amount such that the requested retardation amount is decreased.

The ignition control process controls the ignition timing in accordance with a value obtained by multiplying the requested retardation amount by the smaller one of the first correction coefficient and the second correction coefficient.

In the above-described configuration, the advancement request is quantified by the correction coefficient for the requested retardation amount. Thus, for example, as compared with a case in which the advancement correction amount itself is calculated, the request is easily quantified appropriately without referring to the rotation speed and the load.

Example 3

In the controller of Example 1 or 2, the first advancement requesting process includes a first guard process. The first guard process variably sets a first guard value, which is an upper limit value of an advancement request made by the first advancement requesting process in accordance with at least one of a coolant temperature of the internal combustion engine, a rotation speed of a crankshaft of the internal combustion engine, and a load of the internal combustion engine, and the first guard process sets the advancement request made by the first advancement requesting process to be less than or equal to the first guard value.

For example, during cold startup of the internal combustion engine, even if the temperature of the exhaust purifying device is increased due to an imbalance anomaly at the same time as when the temperature of the exhaust purifying device is increased as the exhaust temperature is increased due to retardation of the ignition timing, the temperature of the exhaust purifying device does not necessarily increase excessively. Furthermore, for example, at the operating point at which the exhaust temperature is low when there is no imbalance anomaly also, even if the temperature of the exhaust purifying device is increased due to an imbalance anomaly at the same time as when the temperature of the exhaust purifying device is increased as the exhaust temperature is increased due to retardation of the ignition timing, the temperature of the exhaust purifying device does not necessarily increase excessively. For these reasons, in the above-described configuration, the first guard value is set in accordance with the coolant temperature, the rotation speed, and the load, and the advancement request is maintained to a value less than or equal to the first guard value. Consequently, the configuration inhibits the ignition timing from being unnecessarily advanced.

Example 4

In the controller of any one of Examples 1 to 3, the second advancement requesting process includes a second guard process. The second guard process variably sets a second guard value, which is an upper limit value of an advancement request made by the second advancement requesting process in accordance with at least one of a coolant temperature of the internal combustion engine, a rotation speed of a crankshaft of the internal combustion engine, and a load of the internal combustion engine, and the second guard process sets the advancement request made by the second advancement requesting process to be less than or equal to the second guard value.

For example, during cold startup of the internal combustion engine, even if the temperature of the exhaust purifying device is increased due to an increase in the torque fluctuation at the same time as when the temperature of the exhaust purifying device is increased as the exhaust temperature is increased due to retardation of the ignition timing, the temperature of the exhaust purifying device does not necessarily increase excessively. Furthermore, for example, at the operating point at which the exhaust temperature is low, even if the temperature of the exhaust purifying device is increased due to an increase in the torque fluctuation at the same time as when the temperature of the exhaust purifying device is increased as the exhaust temperature is increased due to retardation of the ignition timing, the temperature of the exhaust purifying device does not necessarily increase excessively. For these reasons, in the above-described configuration, the second guard value is set in accordance with the coolant temperature, the rotation speed, and the load, and the advancement request is maintained to a value less than or equal to the second guard value. Consequently, the configuration inhibits the ignition timing from being unnecessarily advanced.

Example 5

In the controller of Example 2, the second advancement requesting process includes a process of causing a changing speed of the request for the ignition timing that is changed in accordance with a change in the torque fluctuation amount from a great value to a small value to be lower than a changing speed of the request for the ignition timing that is changed in accordance with a change in the torque fluctuation amount from a small value to a great value.

If the torque fluctuation is great, unburnt fuel and oxygen flow into the exhaust purifying device, and the temperature of the exhaust purifying device may possibly increase. It is therefore desirable to promptly reduce the retardation amount of the ignition timing to decrease the exhaust temperature. However, if the ignition timing is rapidly retarded when the torque fluctuation is changed from the great value to the small value, the combustion state may possibly change abruptly. For this reason, the above-described speed is set aiming at promptly inhibiting the temperature increase of the exhaust purifying device when the torque fluctuation amount is increased and restoring the original ignition timing while inhibiting abrupt change in the combustion state when the torque fluctuation amount is decreased.

Example 6

A method for controlling an internal combustion engine that executes various processes disclosed in Examples 1 to 5 is embodied.

Example 7

A non-transitory computer-readable medium storing programs that cause a processor to execute various processes disclosed in Examples 1 to 5 is embodied.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A controller for an internal combustion engine according to one embodiment will now be described with reference to FIGS. 1 to 6.

Figure 1:
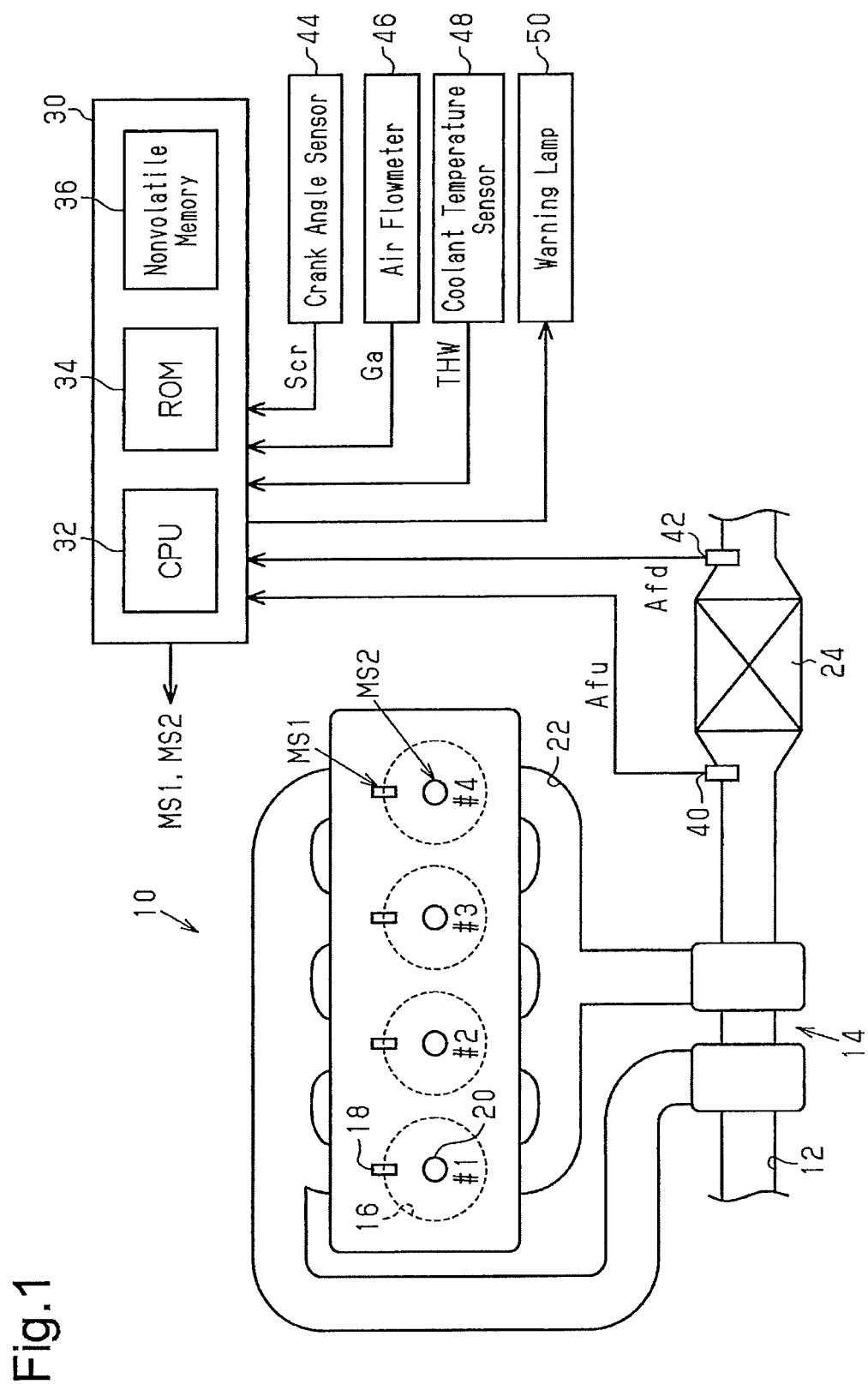
FIG. 1 is a diagram of an internal combustion engine and a controller for an internal combustion engine according to one embodiment.

An internal combustion engine 10 shown in FIG. 1 is mounted on a vehicle. In the internal combustion engine 10, the air drawn in from an intake passage 12 flows into combustion chambers 16 of respective cylinders #1 to #4 via a forced-induction device 14. Each of the cylinders #1 to #4 is provided with a fuel injection valve 18 configured to inject fuel and an ignition device 20 configured to generate spark discharge. In each combustion chamber 16, air-fuel mixture is subjected to combustion, and the air-fuel mixture subjected to combustion is exhausted to an exhaust passage 22 as exhaust gas. A three-way catalyst 24 having an oxygen storage capacity is provided in a section of the exhaust passage 22 that is downstream of the forced-induction device 14.

A controller 30 controls the internal combustion engine 10 and controls the controlled portions of the engine 10 such as the fuel injection valves 18 and the ignition devices 20, thereby controlling the controlled amounts (the torque, exhaust components, and the like). At this time, the controller 30 refers to an upstream air-fuel ratio Afu detected by an air-fuel ratio sensor 40 provided upstream of the three-way catalyst 24 and a downstream air-fuel ratio Afd detected by an air-fuel ratio sensor 42 provided downstream of the three-way catalyst 24. Further, the controller 30 refers to the output signal Scr of a crank angle sensor 44, the intake air amount Ga detected by an air flowmeter 46, the temperature of the coolant water of the internal combustion engine 10 (coolant temperature THW) detected by a coolant temperature sensor 48. The controller 30 includes a CPU 32, a ROM 34, and a nonvolatile memory 36, which can be electrically rewritten and executes control of the above-described controlled amounts by executing programs stored in the ROM 34 using the CPU 32.

Figure 2:
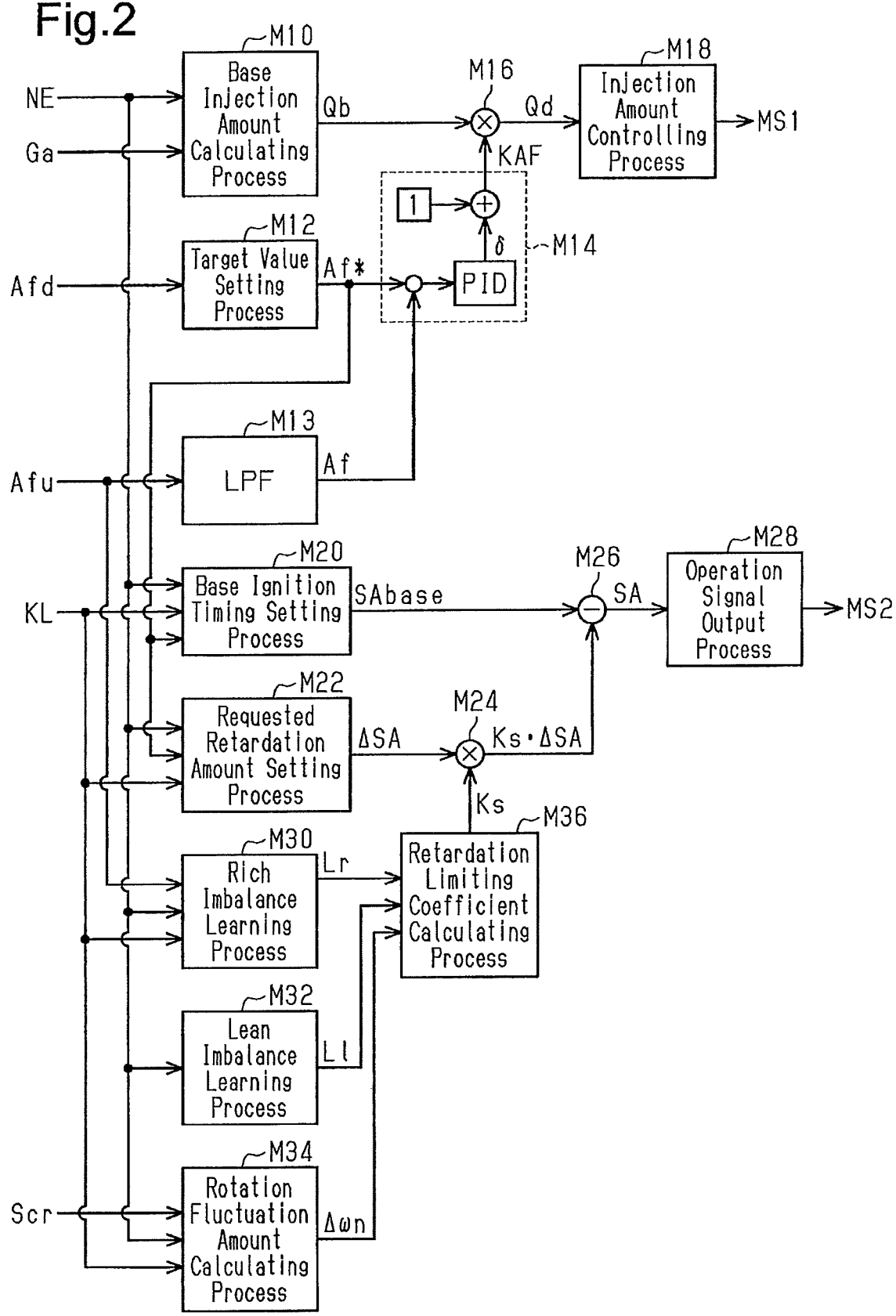
FIG. 2 is a block diagram showing part of processes executed by the controller in the internal combustion engine of FIG. 1.
Figure 3:
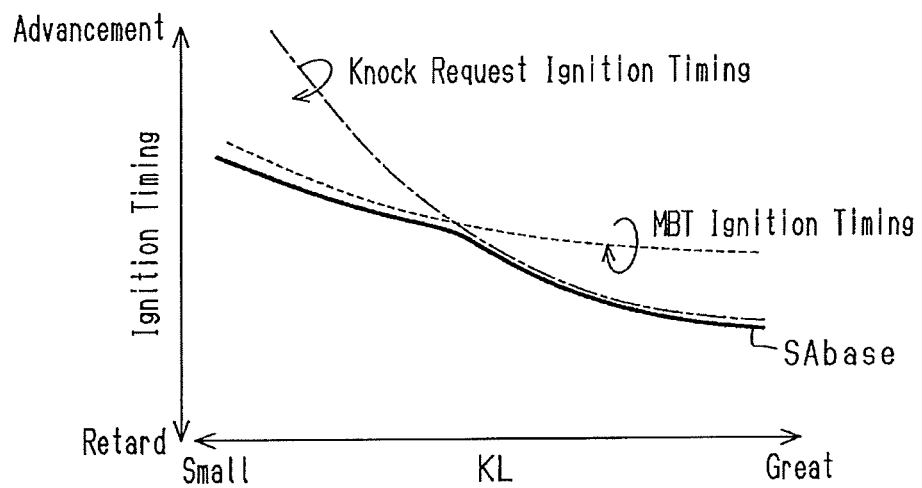
FIG. 3 is a diagram illustrating an ignition timing setting process in the internal combustion engine of FIG. 1.

FIG. 2 shows part of the processes that are implemented by the CPU 32 executing programs stored in the ROM 34.

A base injection amount calculating process M10 calculates a base injection amount Qb based on the intake air amount Ga and the rotational speed NE, which is calculated based on the output signal Scr of the crank angle sensor 44. The base injection amount Qb is an open-loop operation amount, which is an operation amount for executing open-loop control to set the air-fuel ratio of the air-fuel mixture in the combustion chambers 16 to a target air-fuel ratio.

A target value setting process M12 sets a target value Af* of the feedback control amount that is used to control the air-fuel ratio of the air-fuel mixture in the combustion chamber 16 to be the target air-fuel ratio. More specifically, in the present embodiment, the target value setting process M12 includes correcting the target value Af* with an operation amount used to execute feedback control to cause the downstream air-fuel ratio Afd to be the target value.

A low-pass filter process M13 calculates an air-fuel ratio Af by subjecting the upstream air-fuel ratio Afu to a low-pass filtering process.

A feedback process M14 calculates a feedback operation amount KAF, which is an operation amount used to execute feedback control to cause the air-fuel ratio Af, which is a feedback control amount, to be the target value Af*. In the present embodiment, the sum of the output values of a proportional element, an integral element, and a differential element that have, as the input, the difference between the target value Af* and the air-fuel ratio Af is used as a correction factor $\delta$ of the base injection amount Qb, and the feedback operation amount KAF is set to $(1+\delta)$.

A required injection amount calculating process M16 corrects the base injection amount Qb by multiplying the base injection amount Qb by the feedback operation amount KAF, thereby calculating a required injection amount Qd.

An injection amount controlling process M18 generates an operation signal MS1 for the fuel injection valve 18 and outputs the operation signal MS1 to the fuel injection valve 18 to control the fuel injection valve 18 in such a manner that the amount of fuel injected from the fuel injection valve 18 becomes equal to an amount corresponding to the required injection amount Qd, which is output from the required injection amount calculating process M16.

A base ignition timing setting process M20 sets a base ignition timing SAbase in accordance with the rotation speed NE, a load factor KL, and the target value Af*. As shown by the solid line in FIG. 3, the base ignition timing SAbase is the more retarded one of two ignition timings including the minimum advance for best torque (MBT) ignition timing, which is the ignition timing at which the generation efficiency of the engine torque becomes the maximum, and a knock request ignition timing, which is the limit of advancement of the ignition timing that can avoid generation of knocking. The process is implemented by storing map data that uses the rotation speed NE, the load factor KL, and the target value Af* as the input variable and the base ignition timing SAbase as the output variable in the ROM 34 and allowing the CPU 32 to perform map computation of the base ignition timing SAbase. The map data refers to a data set of discrete values of the input variable and values of the output variable each corresponding to a value of the input variable. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result. The load factor KL is the ratio of the inflow air amount per combustion cycle of one cylinder to a reference inflow air amount. The load factor KL quantifies the cylinder filling air amount. The reference inflow air amount may be variably set in accordance with the rotational speed NE.

Referring back to FIG. 2, a requested retardation amount setting process M22 calculates a requested retardation amount $\Delta SA$, which is a retardation amount used to reduce vibration and noise of the vehicle caused due to a rapid increase in the combustion pressure. The factor behind this is that the combustion of the air-fuel mixture in the combustion chamber 16 is performed at a high-speed since the internal combustion engine 10 of the present embodiment has a high compression ratio. More specifically, the requested retardation amount setting process M22 variably sets the requested retardation amount ΔSA in accordance with the rotation speed NE, the load factor KL, and the target value Af*. The process is implemented by storing map data that uses the rotation speed NE, the load factor KL, and the target value Af* as the input variable and the requested retardation amount ΔSA as the output variable in the ROM 34 and allowing the CPU 32 to perform map computation of the requested retardation amount ΔSA.

A retardation limiting process M24 multiplies the requested retardation amount ΔSA by a retardation limiting coefficient Ks, which will be discussed below. A retardation correction process M26 subtracts Ks·ΔSA from the base ignition timing SAbase to calculate the ignition timing SA. The value of the ignition timing SA is increased as the ignition timing SA is advanced.

An operation signal output process M28 outputs an operation signal MS2 to the ignition device 20 to operate the ignition device 20 in accordance with the ignition timing SA.

A rich imbalance learning process M30 calculates a learning value of a rich imbalance, that is, a rich learning value Lr and stores the rich learning value Lr in the nonvolatile memory 36. In this specification, the rich imbalance refers to a case in which, when the fuel injection valves 18 of the cylinders #1 to #4 are operated to control the air-fuel ratios of the air-fuel mixture in all the cylinders #1 to #4 to be the same value, the air-fuel ratio of a specific cylinder becomes richer than the above-described same value. More specifically, the rich imbalance learning process M30 includes calculating the variation of the upstream air-fuel ratio Afu per a predetermined time, which is a time variation ΔAf, from time-series data of the upstream air-fuel ratio Afu and calculating the rich learning value Lr based on the time variation ΔAf. In this embodiment, when the time variation ΔAf is great, the rich imbalance is greater than that when the time variation ΔAf is small, and the rich learning value Lr is calculated to be a great value. However, since the time variation ΔAf also changes in accordance with the rotation speed NE and the load factor KL besides the rich imbalance, a normalization coefficient is determined based on the rotation speed NE and the load factor KL, and the time variation ΔAf is divided by the normalization coefficient to be normalized. The process is implemented by storing map data that uses the rotation speed NE and the load factor KL as the input variable and the normalization coefficient as the output variable in the ROM 34 and allowing the CPU 32 to perform map computation of the normalization coefficient.

The rich imbalance learning process M30 includes updating the rich learning value Lr stored in the nonvolatile memory 36 in accordance with the additionally normalized value. In this embodiment, the value stored in the nonvolatile memory 36 only needs to be updated to an exponential moving average processed value of the value stored in the nonvolatile memory 36 and the additionally normalized value. Furthermore, the rich imbalance learning process M30 includes, if the rich learning value Lr is greater than or equal to a predetermined value, operating a warning lamp 50 shown in FIG. 1 and informing the user of the vehicle that there is an anomaly.

A lean imbalance learning process M32 calculates a learning value of lean imbalance, that is, a lean learning value Ll and stores the lean learning value Ll in the nonvolatile memory 36. In this specification, the lean imbalance refers to a case in which, when the fuel injection valves 18 of the cylinders #1 to #4 are operated to control the air-fuel ratios of the air-fuel mixture in all the cylinders #1 to #4 to be the same value, the air-fuel ratio of a specific cylinder becomes leaner than the above-described same value. More specifically, the lean imbalance learning process M32 includes acquiring time-series data of an instantaneous speed ωl, which is the rotation speed in the rotational angle region of 30° including the TDC of the cylinders #1 to #4 calculated based on the output signal Scr of the crank angle sensor 44 and calculating the lean learning value Ll based on the difference Δωl between the instantaneous speeds ωl of a pair of cylinders. In this embodiment, the pair of cylinders are, for example, the pair of cylinders in which the compression top dead center appears one after the other. Furthermore, when the difference Δωl is great, the lean learning value Ll is set to a value greater than that when the difference Δωl is small since the degree of the lean imbalance is great. However, since the difference Δωl changes in accordance with the rotation speed NE and the load factor KL besides the lean imbalance, a normalization coefficient is determined based on the rotation speed NE and the load factor KL, and the difference Δωl is divided by the normalization coefficient to be normalized. The process is implemented by storing map data that uses the rotation speed NE and the load factor KL as the input variable and the normalization coefficient as the output variable in the ROM 34 and allowing the CPU 32 to perform map computation of the normalization coefficient.

The lean imbalance learning process M32 also includes updating the lean learning value Ll stored in the nonvolatile memory 36 based on the additionally normalized value. In this embodiment, the value stored in the nonvolatile memory 36 is updated to an exponential moving average processed value of the value stored in the nonvolatile memory 36 and the additionally normalized value. Furthermore, the lean imbalance learning process M32 includes, if the lean learning value Ll is greater than or equal to a predetermined value, operating the warning lamp 50 shown in FIG. 1 and informing the user of the vehicle that there is an anomaly.

A rotation fluctuation amount calculating process M34 calculates a value obtained by normalizing the rotation fluctuation amount Δωa, that is, a normalized rotation fluctuation amount Δωn based on the output signal Scr. In this embodiment, the rotation fluctuation amount Δω is an absolute value of a value obtained by subtracting the rotation speed at a predetermined angular interval including the compression top dead center only once, that is, an instantaneous rotation speed ω of one of the pair of cylinders in which the compression top dead center appears later from that of the other cylinder in which the compression top dead center appears in advancement among the pair of cylinders in which the compression top dead center appears one after the other.

Figure 4:
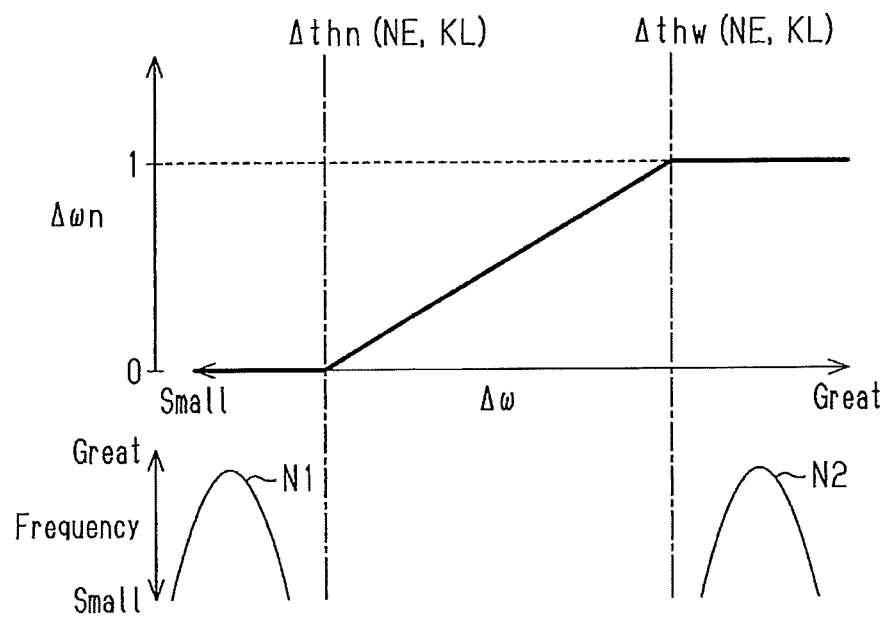
FIG. 4 is a diagram showing a rotation fluctuation amount calculating process in the internal combustion engine of FIG. 1.

FIG. 4 shows the details of the rotation fluctuation amount calculating process M34. FIG. 4 shows a frequency distribution N1 of the rotation fluctuation amount Δω during normal operation and a frequency distribution N2 of the rotation fluctuation amount Δω during a misfire. The rotation fluctuation amount Δω at a normal threshold value Δthn is greater than an average rotation fluctuation amount Δω of the frequency distribution N1, and the rotation fluctuation amount Δω at an anomaly threshold value Δthw is less than an average rotation fluctuation amount Δω of the frequency distribution N2. The anomaly threshold value Δthw is greater than the normal threshold value Δthn. Considering the fact that the frequency distributions N1, N2 change in accordance with the rotation speed NE and the load factor KL, the rotation fluctuation amount calculating process M34 includes variably setting the normal threshold value Δthn and the anomaly threshold value Δthw in accordance with the rotation speed NE and the load factor KL. More specifically, the map data that uses the rotation speed NE and the load factor KL as the input variable and the normal threshold value Δthn as the output variable and the map data that uses the rotation speed NE and the load factor KL as the input variable and the anomaly threshold value Δthw as the output variable are stored in the ROM 34. The CPU 32 only needs to perform map computation of the normal threshold value Δthn and the anomaly threshold value Δthw. Furthermore, the rotation fluctuation amount calculating process M34 sets the normalized rotation fluctuation amount Δωn to 0 when the rotation fluctuation amount Δω is less than or equal to the normal threshold value Δthn and sets the normalized rotation fluctuation amount Δωn to 1 when the rotation fluctuation amount Δω is greater than or equal to the anomaly threshold value Δthw. When the rotation fluctuation amount Δω is greater than the normal threshold value Δthn and less than the anomaly threshold value Δthw, the greater the rotation fluctuation amount Δω is, the greater the normalized rotation fluctuation amount Δωn is set to. Thus, the normalized rotation fluctuation amount Δωn is greater than or equal to 0 and less than or equal to 1.

Referring back to FIG. 2, a retardation limiting coefficient calculating process M36 calculates a retardation limiting coefficient Ks based on the rich learning value Lr, the lean learning value Ll, and the normalized rotation fluctuation amount Δωn.

Figure 5:
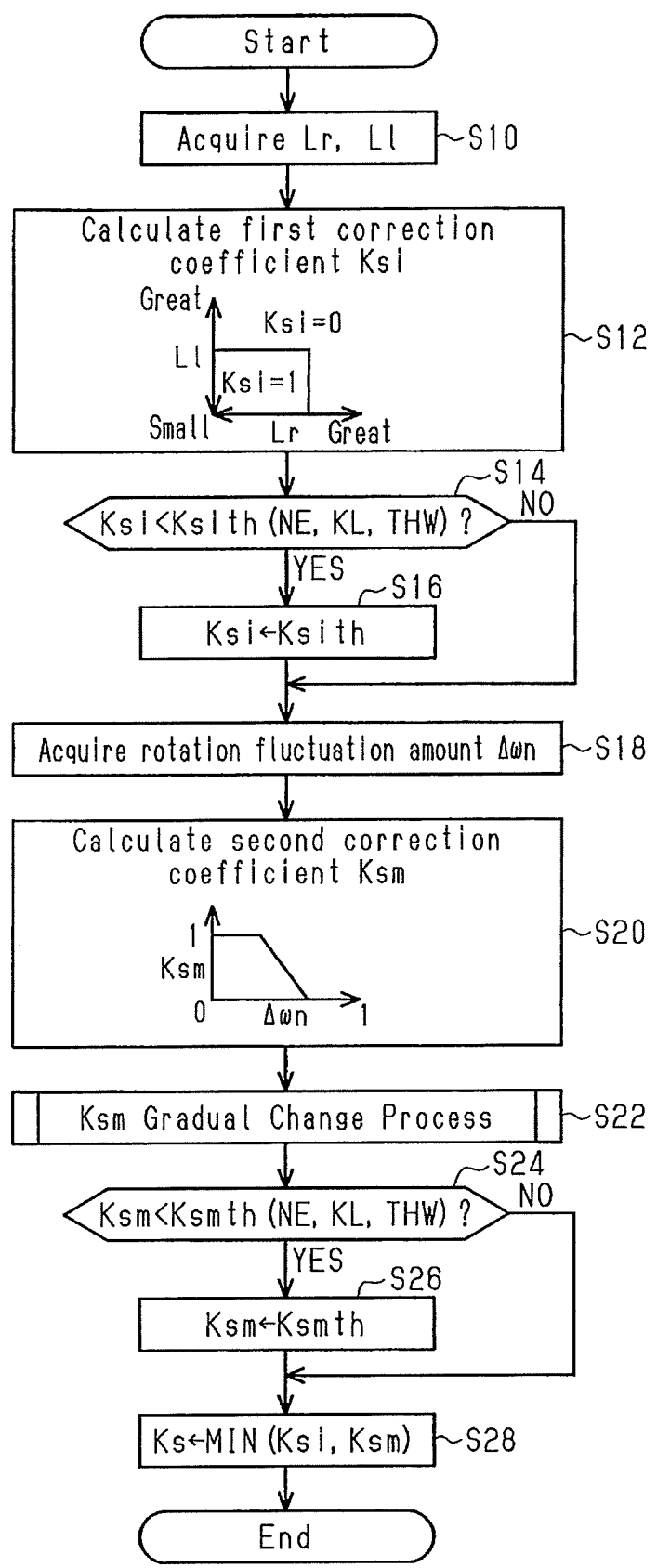
FIG. 5 is a flowchart showing a routine of a retardation limiting coefficient calculating process in the internal combustion engine of FIG. 1.

FIG. 5 shows a routine of the retardation limiting coefficient calculating process M36. The process shown in FIG. 5 is performed by the CPU 32 repeatedly executing programs stored in the ROM 34 at a predetermined interval. In the following description, the number of each step is represented by the letter S followed by a numeral.

In the series of steps shown in FIG. 5, the CPU 32 reads the rich learning value Lr and the lean learning value Ll from the nonvolatile memory 36 to acquire the rich learning value Lr and the lean learning value Ll (S10). The CPU 32 subsequently calculates a first correction coefficient Ksi based on the rich learning value Lr and the lean learning value Ll (S12). The first correction coefficient Ksi is a coefficient that serves as the basis of the retardation limiting coefficient Ks. More specifically, if the logical sum of the condition that the rich learning value Lr is greater than or equal to the predetermined value and the condition that the lean learning value Ll is greater than or equal to the predetermined value is true, the CPU 32 sets the first correction coefficient Ksi to 0, and if the logical sum is false, the CPU 32 sets the first correction coefficient Ksi to 1. The above process is performed considering the fact that if the degree of the rich imbalance or the degree of the lean imbalance is great, the temperature of the three-way catalyst 24 is increased due to the imbalance, and retarding the ignition timing SA in accordance with the requested retardation amount ΔSA may possibly increase the temperature of the three-way catalyst 24 excessively. That is, if the degree of the imbalance is great, the first correction coefficient Ksi is set to 0 so that the retardation limiting coefficient Ks is set to 0 through the process (S28), which will be discussed below. This invalidates the retardation of the ignition timing using the requested retardation amount ΔSA.

Subsequently, the CPU 32 determines whether the first correction coefficient Ksi is less than a first guard value Ksith (S14). In this embodiment, the CPU 32 variably sets the first guard value Ksith in accordance with the rotation speed NE, the load factor KL, and the coolant temperature THW in a range from 0 to 1. More specifically, the CPU 32 grasps the exhaust temperature from the operating point of the internal combustion engine 10 defined by the rotation speed NE and the load factor KL, and when the exhaust temperature grasped from the operating point is low, the CPU 32 sets the first guard value Ksith to a value greater than that when the exhaust temperature grasped from the operating point is high. This is because it is presumed that, when the original exhaust temperature is low, the temperature of the three-way catalyst 24 will not be excessively increased even in a state in which the temperature of the three-way catalyst 24 is easily increased due to imbalance. Furthermore, when the coolant temperature THW is low, the CPU 32 sets the first guard value Ksith to a value greater than that when the coolant temperature THW is high. This is because when the coolant temperature THW is low, the temperature of the three-way catalyst 24 is likely to be lower than that when the coolant temperature THW is high, and it is presumed that the temperature of the three-way catalyst 24 will not be excessively increased even in a state in which the temperature of the three-way catalyst 24 is easily increased due to imbalance. More specifically, the map data that uses the rotation speed NE, the load factor KL, and the coolant temperature THW as the input variable and the first guard value Ksith as the output variable is stored in the ROM 34, and the CPU 32 only needs to perform map computation of the first guard value Ksith.

If it is determined that the first correction coefficient Ksi is less than the first guard value Ksith (S14: YES), the CPU 32 substitutes the first guard value Ksith for the first correction coefficient Ksi (S16). When the process of S16 is completed, or if the decision outcome of the process of S14 is negative, the CPU 32 acquires the normalized rotation fluctuation amount Δωn (S18). The CPU 32 subsequently calculates the second correction coefficient Ksm based on the normalized rotation fluctuation amount Δωn (S20). The second correction coefficient Ksm is a coefficient that serves as the basis of the retardation limiting coefficient Ks. If the normalized rotation fluctuation amount Δωn is less than or equal to a predetermined value, the CPU 32 sets the second correction coefficient Ksm to 1, and if the normalized rotation fluctuation amount Δωn is greater than or equal to a specified value greater than the predetermined value, the CPU 32 sets the second correction coefficient Ksm to 0. In a case in which the normalized rotation fluctuation amount Δωn is greater than the predetermined value and less than the specified value, when the normalized rotation fluctuation amount Δωn is great, the CPU 32 sets the second correction coefficient Ksm to a value smaller than that when the normalized rotation fluctuation amount Δωn is small. The setting is made considering the fact that in a case in which a misfire or a similar combustion state occurs, unburned fuel and oxygen flow into the three-way catalyst 24 and are subjected to combustion in the three-way catalyst 24, which causes the temperature of the three-way catalyst 24 to be increased. Thus, retarding the ignition timing in accordance with the requested retardation amount ΔSA may possibly increase the temperature of the three-way catalyst 24 excessively. That is, if the normalized rotation fluctuation amount Δωn is great, causing the second correction coefficient Ksm to approach 0 causes the retardation limiting coefficient Ks to approach 0 through the process (S28), which will be discussed below. This limits retardation of the ignition timing using the requested retardation amount ΔSA.

Subsequently, the CPU 32 executes a gradual change process of the second correction coefficient Ksm (S22).

Figure 6:
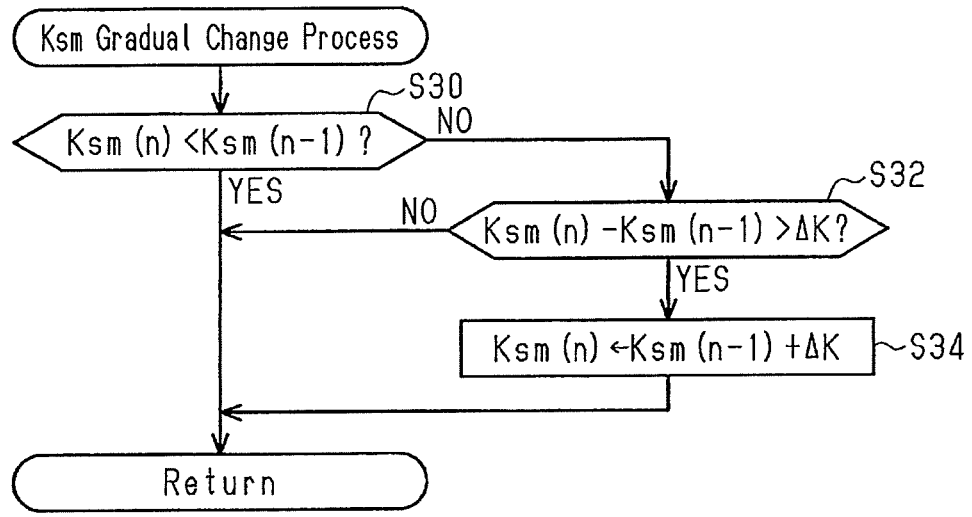
FIG. 6 is a flowchart showing a routine of a second correction coefficient gradual change process in the internal combustion engine of FIG. 1.

FIG. 6 shows a routine of the gradual change process. The process shown in FIG. 6 is performed by the CPU 32 repeatedly executing programs stored in the ROM 34 at a predetermined interval.

In the series of steps shown in FIG. 6, the CPU 32 first determines whether the second correction coefficient Ksm(n) currently calculated through the process of S20 is less than the previously calculated second correction coefficient Ksm(n−1) (S30). If it is determined that the currently calculated second correction coefficient Ksm(n) is greater than or equal to the previously calculated second correction coefficient Ksm(n−1) (S30: NO), the CPU 32 determines whether a value obtained by subtracting the previously calculated second correction coefficient Ksm(n−1) from the currently calculated second correction coefficient Ksm(n) is greater than a gradual change value ΔK (S32). If it is determined that value obtained by subtracting the previously calculated second correction coefficient Ksm(n−1) from the currently calculated second correction coefficient Ksm(n) is greater than the gradual change value ΔK (S32: YES), the CPU 32 substitutes the value obtained by adding the gradual change value ΔK to the previously calculated second correction coefficient Ksm(n−1) for the currently calculated second correction coefficient Ksm(n) (S34). The process limits the rate of increase of the second correction coefficient Ksm using the gradual change value ΔK. The process limits the speed of retarding the ignition timing. When the process of S34 is completed, or if the decision outcome of the process of S30 is positive, or if the decision outcome of the process of S32 is negative, the CPU 32 temporarily suspends the process of FIG. 6.

Referring back to FIG. 5, the CPU 32 determines whether the second correction coefficient Ksm is smaller than the second guard value Ksmth (S24). In this embodiment, the CPU 32 variably sets the second guard value Ksmth in a range from 0 to 1 in accordance with the rotation speed NE, the load factor KL, and the coolant temperature THW. More specifically, the CPU 32 grasps the exhaust temperature from the operating point of the internal combustion engine 10 defined by the rotation speed NE and the load factor KL. When the exhaust temperature grasped from the operating point is low, the CPU 32 sets the second guard value Ksmth to a value greater than that when the exhaust temperature grasped from the operating point is high. This is because it is presumed that when the original exhaust temperature is low, the temperature of the three-way catalyst 24 will not be excessively increased even in a state in which the temperature of the three-way catalyst 24 is easily increased due to, for example, a misfire. Furthermore, when the coolant temperature THW is low, the CPU 32 sets the second guard value Ksmth to a value greater than that when the coolant temperature THW is high. This is because when the coolant temperature THW is low, the temperature of the three-way catalyst 24 is likely to be lower than that when the coolant temperature THW is high, and it is presumed that the temperature of the three-way catalyst 24 will not be excessively increased even in a state in which the temperature of the three-way catalyst 24 is easily increased due to, for example, a misfire. More specifically, the map data that uses the rotation speed NE, the load factor KL, and the coolant temperature THW as the input variable and the second guard value Ksmth as the output variable is stored in the ROM 34, and the CPU 32 only needs to perform map computation of the second guard value Ksmth.

If it is determined that the second correction coefficient Ksm is less than the second guard value Ksmth (S24: YES), the CPU 32 substitutes the second guard value Ksmth for the second correction coefficient Ksm (S26). When the process of S26 is completed, or if the decision outcome of the process of S24 is negative, the CPU 32 substitutes the smaller one of the first correction coefficient Ksi and the second correction coefficient Ksm for the retardation limiting coefficient Ks (S28). When the process of step S28 is completed, the CPU 32 temporarily ends the series of processes shown in FIG. 5.

The operation and advantages of the present embodiment will now be described.

If the rich learning value Lr or the lean learning value Ll is greater than or equal to the predetermined value, the CPU 32 sets the retardation limiting coefficient Ks to 0 and sets the base ignition timing SAbase as the ignition timing SA without correcting the base ignition timing SAbase using the requested retardation amount ΔSA. Thus, even if there is a tendency that the temperature of the three-way catalyst 24 is easily increased due to an imbalance anomaly at the same time as when the exhaust temperature is increased due to retardation of the ignition timing, the temperature of the three-way catalyst 24 is inhibited from being excessively increased.

Furthermore, when the normalized rotation fluctuation amount Δωn is great, the CPU 32 sets the retardation amount of the base ignition timing SAbase to be smaller than that when the normalized rotation fluctuation amount Δωn is small. Thus, even if there is a tendency that the temperature of the three-way catalyst 24 is easily increased due to the combustion state in which the normalized rotation fluctuation amount Δωn is increased at the same time as when the exhaust temperature is increased due to retardation of the ignition timing, the temperature of the three-way catalyst 24 is inhibited from being excessively increased.

In particular, the present embodiment appropriately addresses both the imbalance anomaly and the deterioration of the combustion state such as a misfire by setting the smaller one of the first correction coefficient Ksi and the second correction coefficient Ksm as the retardation limiting coefficient Ks.

The present embodiment described above further has the following advantages.

(1) The value of the first correction coefficient Ksi is limited to be greater than or equal to the first guard value Ksith. Thus, the ignition timing is inhibited from being advanced unnecessarily.

(2) The value of the second correction coefficient Ksm is limited to be greater than or equal to the second guard value Ksmth. Thus, the ignition timing is inhibited from being advanced unnecessarily.

(3) The changing speed of the second correction coefficient Ksm when the second correction coefficient Ksm is changed to a great value is set to be lower than that when the second correction coefficient Ksm is changed to a small value. Thus, when a misfire or a similar situation occurs, the retardation amount of the ignition timing is promptly reduced to decrease the exhaust temperature, and when the internal combustion engine 10 restores from a misfire or a similar situation, rapid change of the combustion state that may otherwise be caused by rapidly retarding the ignition timing is inhibited.

<Correspondence>

The correspondence between the items in the above embodiments and the items described in the above SUMMARY is as follows. Below, the correspondence is shown for each of the numbers in the examples described in the above SUMMARY.

In Example 1, a first advancement requesting process corresponds to the processes of S10 to S16, and a second advancement requesting process corresponds to the processes of S18 to S26. An ignition control process corresponds to the process of S28, the processes of the retardation limiting process M24, the retardation correction process M26, and the operation signal output process M28.

In Example 3, the first guard process corresponds to the processes of S14 and S16.

In Example 4, the second guard process corresponds to the processes of S24 and S26.

Example 5 corresponds to the process of FIG. 6.

Other Embodiments

The above-described embodiment and the following modifications can be combined as long as the combined modifications remain technically consistent with each other.

Regarding Imbalance Learning Process

The learning process of learning the rich learning value Lr is not limited to the one illustrated in the above-described embodiment. For example, when the difference between the maximum value and the minimum value of the upstream air-fuel ratio Afu is great, the degree of the rich imbalance is presumed to be greater than that when the difference is small, and the rich learning value Lr may be calculated. The learning process of learning the rich learning value Lr is not limited to the one that uses the upstream air-fuel ratio Afu. For example, when the downstream air-fuel ratio Afd is richer than the target air-fuel ratio, and the deviation is great, the degree of the rich imbalance is presumed to be greater than that when the deviation is small, and the rich learning value Lr may be calculated.

The learning process of learning the lean learning value Ll is not limited to the one illustrated in the above-described embodiment. For example, the rotational angle region used to calculate the instantaneous speed ωl does not necessarily have to include the TDC. Furthermore, for example, the speed is not limited to the speed in the rotational angle region of 30° CA, but may be, for example, the speed in the rotational angle region of 60° CA. However, the period of time in which the rotation speed of the crankshaft becomes the maximum due to the combustion stroke of each cylinder is desirably included. Furthermore, for example, when the downstream air-fuel ratio Afd is leaner than the target air-fuel ratio, and the deviation is great, the degree of the lean imbalance is presumed to be greater than that when the deviation is small, and the lean learning value Ll may be calculated.

The rich learning value Lr and the lean learning value Ll do not necessarily have to be learned separately. For example, when the downstream air-fuel ratio Afd is leaner than the target air-fuel ratio, and the deviation is great, the degree of the lean or rich imbalance is presumed to be greater than that when the deviation is small, and the degree of the imbalance may be learned.

The imbalance learning process does not necessarily have to use the value of the air-fuel ratio sensor or the instantaneous speed ωl. For example, each of the cylinders #1 to #4 may include a cylinder pressure sensor, and the imbalance learning process may include calculating the rate of heat release based on detection values from the cylinder pressure sensors, estimating the injection amount based on the rate of heat release, and quantifying the degree of variation of the estimated injection amount.

Regarding First Guard Process

In the above-described embodiment, the first guard value Ksith is variably set based on the rotation speed NE, the load factor KL, and the coolant temperature THW, but the configuration is not limited to this. For example, the first guard value Ksith may be variably set based only on one or two parameters among the rotation speed NE, the load factor KL, and the coolant temperature THW. For example, the first guard value Ksith may be variably set based only on the coolant temperature THW.

As will be described below in the section of "Regarding First Advancement Requesting Process," in a case in which the correction amount for advancing the ignition timing SA is calculated instead of the first correction coefficient Ksi, the process only needs to calculate the upper limit value of the advancing correction amount instead of the first guard value Ksith. In this case, the rotation speed NE and the load factor KL are desirably used to calculate the upper limit value in addition to the learning values such as the rich learning value Lr and the lean learning value Ll.

Regarding First Advancement Requesting Process

In the above-described embodiment, the first correction coefficient Ksi is set based on the rich learning value Lr and the lean learning value Ll, but the configuration is not limited to this. For example, as described in the above section "Regarding Imbalance Learning Process", when the rich imbalance and the lean imbalance are quantified using the same learning value, the first correction coefficient Ksi only needs to be calculated based on that single learning value.

In the above-described embodiment, the value of the first correction coefficient Ksi is set to 1 or 0, but the configuration is not limited to this. For example, any value greater than or equal to 0 and less than or equal to 1 may be set, and when the degree of imbalance is great, the first correction coefficient Ksi may be set to a value smaller than that when the degree of imbalance is small.

As will be described in the following section "Regarding Setting of Ignition Timing", when the amount corresponding to the above-described ignition timing SA obtained by correcting the base ignition timing SAbase using the requested retardation amount ΔSA is directly calculated based on the operating point of the internal combustion engine 10, the correction amount for advancing the ignition timing SA only needs to be calculated instead of the first correction coefficient Ksi. In this case, the rotation speed NE and the load factor KL are desirably used to calculate the correction amount in addition to the learning value such as the rich learning value Lr and the lean learning value Ll.

Regarding Second Guard Process

In the above-described embodiment, the second guard value Ksmth is variably set based on the rotation speed NE, the load factor KL, and the coolant temperature THW, but the configuration is not limited to this. The second guard value Ksmth may be variably set based only on one or two parameters among the rotation speed NE, the load factor KL, and the coolant temperature THW. For example, the second guard value Ksmth may be variably set based only on the coolant temperature THW.

As will be described in the following section "Regarding Second Advancement Requesting Process", when the correction amount for advancing the ignition timing SA is calculated instead of the second correction coefficient Ksm, the upper limit value of the correction amount for advancing the ignition timing SA only needs to be calculated instead of the second guard value Ksmth. In this case, the rotation speed NE and the load factor KL are desirably used to calculate the upper limit value in addition to the normalized rotation fluctuation amount Δωn.

Regarding Second Advancement Requesting Process

In the above-described embodiment, the second correction coefficient Ksm takes any value greater than or equal to 0 and less than or equal to 1, but the configuration is not limited to this. For example, the second correction coefficient Ksm calculated through the process of S20 may be either 0 or 1.

As will be described in the following section "Regarding Setting of Ignition Timing", when the amount corresponding to the above-described ignition timing SA obtained by correcting the base ignition timing SAbase using the requested retardation amount ΔSA is directly calculated based on the operating point of the internal combustion engine 10, the correction amount for advancing the ignition timing SA only needs to be calculated instead of the second correction coefficient Ksm. In this case, the rotation speed NE and the load factor KL are desirably used to calculate the correction amount in addition to the rotation fluctuation amount Δω.

It is not essential to include the gradual change process.

Regarding Limiting Process

As described in the above sections "Regarding First Advancement Requesting Process" and "Regarding Second Advancement Requesting Process", when the correction amount for advancing the ignition timing SA is calculated instead of the first correction coefficient Ksi and the second correction coefficient Ksm, the greater one of the correction amount based on the imbalance learning value and the correction amount based on the normalized rotation fluctuation amount Δωn only needs to be used.

Regarding Torque Fluctuation Amount

In the above-described embodiment, the torque fluctuation amount is quantified using the normalized rotation fluctuation amount Δωn. Thus, the greater the normalized rotation fluctuation amount Δωn, the greater the torque fluctuation amount becomes. However, the configuration is not limited to this. For example, each of the cylinders #1 to #4 may include a cylinder pressure sensor that detects the pressure in the associated combustion chamber 16. The rate of heat release of each cylinder may be calculated based on time-series data of the detection values from the associated cylinder pressure sensor. The torque fluctuation amount that quantifies the difference between the torques of the cylinders #1 to #4 may be calculated by calculating the torque based on the rate of heat release.

Regarding Requested Retardation Amount Setting Process

In the above-described embodiment, the requested retardation amount ΔSA is set based on the target value Af*, the rotation speed NE, and the load factor KL, but the configuration is not limited to this. For example, the air-fuel ratio Af may be used instead of the target value Af*. Alternatively, for example, the load may be the amount of air that fills the combustion chamber 16. Alternatively, for example, instead of the load, which is the load factor KL in this embodiment, the operation amount for controlling the air-fuel ratio to be the target air-fuel ratio, which is the injection amount of the fuel injection valve 18 in this embodiment, may be used. Alternatively, for example, the requested retardation amount ΔSA may be set based on the rotation speed NE and the load, and not the air-fuel ratio.

In the above-described embodiment, the requested retardation amount ΔSA is used to inhibit the vibration and noise of a vehicle, but the configuration is not limited to this. For example, the requested retardation amount may be for warming up the three-way catalyst 24.

Regarding Setting of Ignition Timing

In the above-described embodiment, the base ignition timing SAbase is set based on the target value Af*, the rotation speed NE, and the load factor KL, but the configuration is not limited to this. For example, the air-fuel ratio Af may be used instead of the target value Af*. Alternatively, for example, the load may be the amount of air that fills the combustion chamber 16. Alternatively, for example, instead of the load, which is the load factor KL in this embodiment, the operation amount for controlling the air-fuel ratio to be the target air-fuel ratio, which is the injection amount of the fuel injection valve 18 in this embodiment, may be used. Alternatively, for example, the base ignition timing SAbase may be set based on the rotation speed NE and the load, and not the air-fuel ratio.

In the above-described embodiment, the base ignition timing SAbase is corrected using the requested retardation amount ΔSA to determine the ignition timing SA, but the configuration is not limited to this. For example, the ignition timing SA obtained by correcting the above-described base ignition timing SAbase using requested retardation amount ΔSA may be directly calculated based on the operating point defined by the load such as the load factor KL and the rotation speed NE. The process is executed by, for example, storing map data that uses the rotation speed NE and the load as the input variable and the ignition timing SA as the output variable in the ROM 34 and allowing the CPU 32 to perform map computation of the ignition timing SA. The process that directly calculates the ignition timing SA based on the operating point is not limited to the process that calculates the ignition timing SA based only on the operating point, but may be, for example, a process that calculates the ignition timing SA based on the operating point and the coolant temperature THW.

Regarding Controller

The controller is not limited to a device that includes the CPU 32 and the ROM 34 and executes software processing. For example, at least part of the processes executed by the software in the above-described embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Regarding Internal Combustion Engine

The internal combustion engine is not limited to a four-cylinder engine. For example, an in-line six-cylinder engine may be used. The fuel injection valve is not limited to one that injects fuel into the combustion chamber 16, but may be one that injects fuel, for example, into the intake passage 12.

The invention claimed is:

1. A controller for an internal combustion engine, the internal combustion engine including ignition devices, fuel injection valves, and an exhaust purifying device, which purifies exhaust gas discharged from a plurality of cylinders, the controller being configured to execute an imbalance learning process of learning a degree of variation in an injection amount of the fuel injection valves provided for the respective cylinders when the fuel injection valves are operated to control air-fuel ratios of the respective cylinders to be equal to each other, a first advancement requesting process of causing a request for ignition timing to be more advanced when the degree of variation is greater than when the degree of variation is small, a second advancement requesting process of causing the request for the ignition timing to be more advanced when a torque fluctuation amount of the internal combustion engine is greater than when the torque fluctuation amount is small, and an ignition control process of controlling the ignition timing in accordance with the request of the more advanced one of the first advancement requesting process and the second advancement requesting process.

2. The controller for an internal combustion engine according to claim 1, wherein the controller is configured to further execute a requested retardation amount setting process of setting a requested retardation amount of the ignition timing in accordance with a rotation speed of a crankshaft and a load of the internal combustion engine, the first advancement requesting process calculates a first correction coefficient, which is a correction coefficient used to multiply the requested retardation amount in order to correct the requested retardation amount such that the requested retardation amount is decreased, the second advancement requesting process calculates a second correction coefficient, which is a correction coefficient used to multiply the requested retardation amount in order to correct the requested retardation amount such that the requested retardation amount is decreased, and the ignition control process controls the ignition timing in accordance with a value obtained by multiplying the requested retardation amount by the smaller one of the first correction coefficient and the second correction coefficient.

3. The controller for an internal combustion engine according to claim 1, wherein the first advancement requesting process includes a first guard process, and the first guard process variably sets a first guard value, which is an upper limit value of an advancement request made by the first advancement requesting process in accordance with at least one of a coolant temperature of the internal combustion engine, a rotation speed of a crankshaft of the internal combustion engine, and a load of the internal combustion engine, and the first guard process sets the advancement request made by the first advancement requesting process to be less than or equal to the first guard value.

4. The controller for an internal combustion engine according to claim 1, wherein the second advancement requesting process includes a second guard process, and the second guard process variably sets a second guard value, which is an upper limit value of an advancement request made by the second advancement requesting process in accordance with at least one of a coolant temperature of the internal combustion engine, a rotation speed of a crankshaft of the internal combustion engine, and a load of the internal combustion engine, and the second guard process sets the advancement request made by the second advancement requesting process to be less than or equal to the second guard value.

5. The controller for an internal combustion engine according to claim 2, wherein the second advancement requesting process includes a process of causing a changing speed of the request for the ignition timing that is changed in accordance with a change in the torque fluctuation amount from a great value to a small value to be lower than a changing speed of the request for the ignition timing that is changed in accordance with a change in the torque fluctuation amount from a small value to a great value.

6. A control method for an internal combustion engine, the internal combustion engine including ignition devices, fuel injection valves, and an exhaust purifying device, which purifies exhaust gas discharged from a plurality of cylinders, the controller method comprising:

learning a degree of variation in an injection amount of the fuel injection valves provided for the respective cylinders when the fuel injection valves are operated to control air-fuel ratios of the respective cylinders to be equal to each other;

a first advancement requesting process of causing a request for ignition timing to be more advanced when the degree of variation is greater than when the degree of variation is small;

a second advancement requesting process of causing the request for the ignition timing to be more advanced when a torque fluctuation amount of the internal combustion engine is greater than when the torque fluctuation amount is small; and controlling the ignition timing in accordance with the request of the more advanced one of the first advancement requesting process and the second advancement requesting process.

7. A non-transitory computer readable memory medium that stores a program that causes a processor to execute a control process for an internal combustion engine, the internal combustion engine including ignition devices, fuel injection valves, and an exhaust purifying device, which purifies exhaust gas discharged from a plurality of cylinders, the control process includes learning a degree of variation in an injection amount of the fuel injection valves provided for the respective cylinders when the fuel injection valves are operated to control air-fuel ratios of the respective cylinders to be equal to each other;

a first advancement requesting process of causing a request for ignition timing to be more advanced when the degree of variation is greater than when the degree of variation is small;

a second advancement requesting process of causing the request for the ignition timing to be more advanced when a torque fluctuation amount of the internal combustion engine is greater than when the torque fluctuation amount is small; and controlling the ignition timing in accordance with the request of the more advanced one of the first advancement requesting process and the second advancement requesting process.

* * * * *